(12) United States Patent
Lucas

(10) Patent No.: US 11,541,326 B2
(45) Date of Patent: Jan. 3, 2023

(54) REGENERATIVE VAPOR ENERGY RECOVERY SYSTEM AND METHOD

(71) Applicant: Lucas E3, L.C., Shawnee, KS (US)

(72) Inventor: Scott A. Lucas, De Soto, KS (US)

(73) Assignee: LucasE3, L.C., Shawnee, KS (US)

( * ) Notice: Subject to any disclaimer, the term of this patent is extended or adjusted under 35 U.S.C. 154(b) by 206 days.

(21) Appl. No.: 16/841,206

(22) Filed: Apr. 6, 2020

(65) Prior Publication Data

US 2020/0316491 A1 Oct. 8, 2020

Related U.S. Application Data

(60) Provisional application No. 62/830,068, filed on Apr. 5, 2019.

(51) Int. Cl.
| | |
|---|---|
| *C12F 3/00* | (2006.01) |
| *B01D 3/00* | (2006.01) |
| *C11B 13/00* | (2006.01) |
| *B01D 3/32* | (2006.01) |

(52) U.S. Cl.
CPC ............. *B01D 3/002* (2013.01); *B01D 3/007* (2013.01); *B01D 3/322* (2013.01); *C11B 13/00* (2013.01); *C12F 3/00* (2013.01)

(58) Field of Classification Search
CPC ........ B01D 3/001; B01D 3/002; B01D 3/003; B01D 3/004; B01D 3/005; B01D 3/007; C12F 3/00; C12F 3/06; C12F 3/10; C12F 5/00
See application file for complete search history.

(56) References Cited

U.S. PATENT DOCUMENTS

| | | | |
|---|---|---|---|
| 2,958,142 | A | 11/1960 | Kershaw et al. |
| 3,363,340 | A | 1/1968 | McKinley |
| 3,673,705 | A | 7/1972 | Wright et al. |
| 4,309,254 | A | 1/1982 | Dahlstrom |
| 5,178,543 | A | 1/1993 | Semans et al. |
| 5,354,203 | A | 10/1994 | Kotch et al. |
| 7,504,546 | B2 | 3/2009 | Brown et al. |
| 7,829,680 | B1 | 11/2010 | Sander et al. |
| 7,867,365 | B2 | 1/2011 | Brown |
| 7,988,580 | B2 | 8/2011 | McCrary |

(Continued)

FOREIGN PATENT DOCUMENTS

AU  2007303117  4/2008

OTHER PUBLICATIONS

Katzen, et al., "Ethanol Distillation: the Fundamentals", 1999, 270-273.

(Continued)

*Primary Examiner* — Jonathan Luke Pilcher
(74) *Attorney, Agent, or Firm* — Law Office of Mark Brown, LLC; Mark E. Brown

(57) ABSTRACT

Regenerative vapor energy recovery system and method for use with an ethanol plant. Regenerative vapors are partially condensed in a regenerative precondenser using a warm water stream. The warm water stream is fed to the regenerative precondenser and the partially condensed regenerative vapor stream is sent back to the ethanol plant where the stream is fully condensed using an existing condenser. The ethanol plant is thus operated at greater energy efficiency with lower operating costs than would be achieved with conventional systems.

18 Claims, 1 Drawing Sheet

(56) References Cited

U.S. PATENT DOCUMENTS

| | | |
|---|---|---|
| 8,173,412 B2 | 5/2012 | Dale |
| 8,778,433 B2 | 7/2014 | Lee |
| 9,012,191 B2 | 4/2015 | Lee |
| 9,029,126 B2 | 5/2015 | Bleyer et al. |
| 9,066,531 B2 | 6/2015 | Williams |
| 9,308,489 B2 | 4/2016 | Brown et al. |
| 9,732,302 B2 | 8/2017 | Lee |
| 9,777,303 B2 | 10/2017 | Jaket et al. |
| 9,931,582 B2 | 4/2018 | Furlong |
| 9,989,310 B2 * | 6/2018 | Knight, Jr. ............ B01D 53/265 |
| 10,267,511 B2 * | 4/2019 | Knight, Jr. ............ B01D 53/265 |
| 10,315,127 B2 * | 6/2019 | Mosslein ................. B01D 3/02 |
| 10,345,043 B2 * | 7/2019 | Knight, Jr. ............ F26B 25/007 |
| 10,859,257 B2 * | 12/2020 | Knight, Jr. ................ F22B 1/14 |
| 2009/0171724 A1 | 7/2009 | Allin et al. |
| 2011/0315541 A1 | 12/2011 | Xu |
| 2014/0053829 A1 | 2/2014 | Lee |
| 2014/0106419 A1 | 4/2014 | Bazzana et al. |
| 2014/0238881 A1 | 8/2014 | Stuhlmann et al. |
| 2014/0343259 A1 | 11/2014 | Bleyer et al. |
| 2015/0041305 A1 | 2/2015 | Overheul et al. |
| 2015/0045594 A1 | 2/2015 | Overheul et al. |
| 2016/0279560 A1 | 9/2016 | Furlong |
| 2017/0227287 A1 * | 8/2017 | Knight, Jr. ............ F26B 23/004 |
| 2018/0031227 A1 * | 2/2018 | Knight, Jr. ............... F26B 23/02 |
| 2018/0172349 A1 * | 6/2018 | Knight, Jr. ............ F26B 25/005 |
| 2018/0290073 A1 | 10/2018 | Brown et al. |
| 2019/0076751 A1 * | 3/2019 | Lucas ........................ C12F 5/00 |
| 2019/0203928 A1 * | 7/2019 | Knight, Jr. ............ B01D 53/265 |
| 2019/0233354 A1 | 8/2019 | Lucas |
| 2019/0336882 A1 * | 11/2019 | Andrade ................. C07C 29/80 |
| 2020/0171404 A1 | 6/2020 | Lucas |

OTHER PUBLICATIONS

Raab, Michael, "Enahnced for Ethanol", Ethanol Producer Magazine, Oct. 2019, ethanolproducer.com/articles/16511/enhanced-for-ethanol, Sep. 16, 2019, 1-2.

* cited by examiner

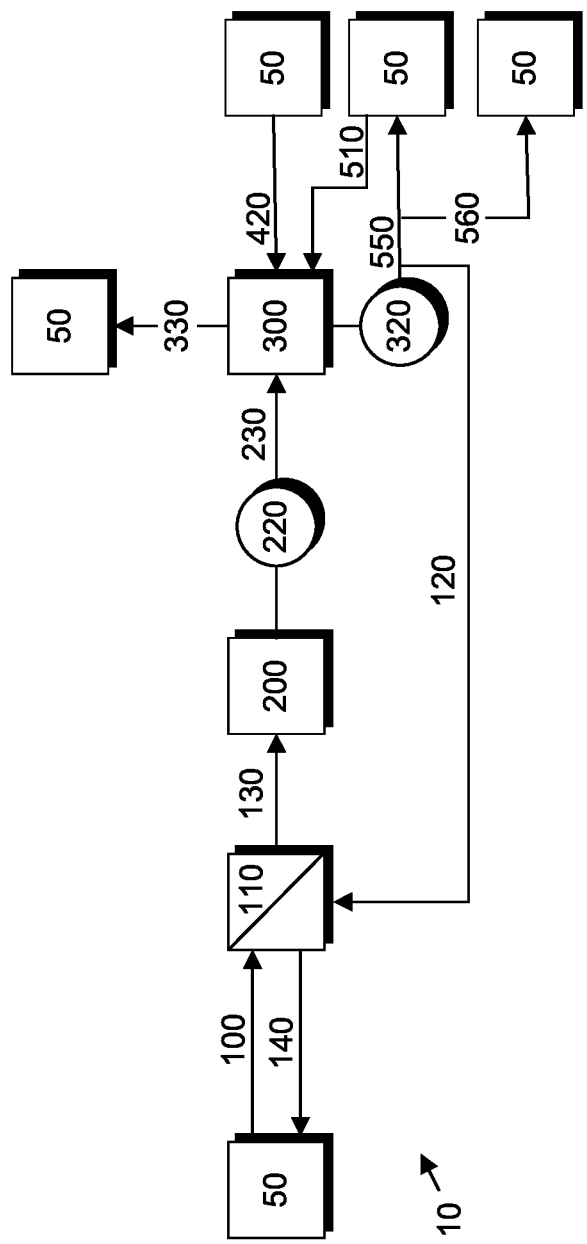

REGENERATIVE VAPOR ENERGY RECOVERY SYSTEM AND METHOD

CROSS-REFERENCE TO RELATED APPLICATION

This application claims priority in U.S. Provisional Patent Application No. 62/830,068, filed Apr. 5, 2019, which is incorporated herein by reference.

BACKGROUND OF THE INVENTION

1. Field of the Invention

The present invention provides systems and methods for regenerative vapor energy recovery in or in conjunction with an ethanol plant.

2. Description of the Related Art

In efforts to reduce dependence on fossil fuels, alternative fuels, such as ethanol, have been widely promoted. Ethanol is an attractive alternative because its combustion tends to produce more energy with less greenhouse gas emission than fossil fuels. Also, producing ethanol has a positive net energy balance. Reducing or eliminating dependence on fossil fuel imports tends to produce important geopolitical, environmental and global economic benefits at a national level.

Ethanol can be produced by fermenting and distilling starches, e.g., from grains, cellulosic material and other organic matter. The resulting ethanol (alcohol) can be suitable for combustion as a fuel source or a fuel supplement. Grain processing generally produces distiller's grain (DG), including remaining fats, proteins, fiber, oils and minerals. DG can be useful for feeding livestock and other applications.

Energy efficiency is an objective of ethanol production for purposes of reducing distillers' operating costs and the environmental footprints from their operations. Producing marketable, high-value DG byproducts is another important objective. For minimizing transportation costs, ethanol plants tend to be located near the grain supply sources and the livestock facilities where the DG byproducts are consumed. For example, such plants are relatively common throughout the corn-producing regions of the United States.

The present invention addresses such ethanol distillation plant efficiency objectives by providing a method and system for regenerating vapor energy recovery.

Heretofore there has not been available a system or method for regenerative vapor energy recovery in connection with an ethanol plant, with the advantages and features of the present invention.

SUMMARY OF THE INVENTION

In practicing an aspect of the present invention, a dryer exhaust heat subsystem captures heat from a dryer and further heats a warm water stream in a scrubber, which outputs hot water to the ethanol plant. In the practice of the method of the present invention, captured dryer exhaust heat increases overall ethanol plant efficiencies by reducing the net energy input required for driving plant operations.

BRIEF DESCRIPTION OF THE DRAWINGS

The drawings constitute a part of this specification and include exemplary embodiments of the present invention illustrating various objects and features thereof.

FIG. 1 is a schematic representation of a regenerative vapor energy recovery system for an ethanol plant embodying an aspect of the present invention.

DETAILED DESCRIPTION OF THE PREFERRED EMBODIMENTS

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. Said terminology will include the words specifically mentioned, derivatives thereof and words of similar meaning.

II. Preferred Embodiment

A regenerative (or regen) vapor energy recovery system embodying an aspect of the present invention is shown in FIG. 1 and is generally designated by the reference 10. As shown in FIG. 1, regen vapors, 100, from the existing plant, 50, will be sent to the regen precondenser 110 where the regen vapors 100 are partially condensed using a warm water stream, 120, that recirculates through the regen precondenser 110. The warm water stream 120 is fed to the regen precondenser 110 at approximately 185° F. and will produce a heated water stream 130 at approximately 195° F. producing a partially condensed regen vapor stream 140. The partially condensed regen vapor stream 140 is sent back to the existing plant 50, where the stream is fully condensed using an existing condenser.

The heated water stream 130 will be produced at a variable rate and fed to a hot Water Surge Tank 200, to be collected for use. The temperature of this stream may vary between 190° F. and 200° F. On a continuous basis the heated water will be pumped using the heated water pump 220 sending the supply heated water 230 to the heated water flash tank 300 where the heated water stream 230 will be cooled to 185° F. creating a heated water flash vapor 330 that will be diverted to the existing plant 50 to be used as an energy source.

The heated water recirculation pump 320 recirculates warm water 120 back to the regen precondenser 110 as needed to send a recirculated water stream 550 back to the existing plant for reuse and to send excess water 560 from the system 10 back to the ethanol plant 50 for use as dilution water. Rectifier bottoms 420 from the existing plant 50 are fed to the heated water flash tank 300 to maintain adequate level in the tank 300. Water from the tank 300 is fed back to the existing plant 50 for use as dilution water 510.

A recirculating water stream 550 from the bottom of the heated water flash tank 300 is pumped to other areas of the existing plant 50 to capture energy in the form of 190° F. to 200° F. heated water 510 that will be fed back to the heated water flash tank 300, releasing energy in the form of heated water flash vapor 330 to the plant 50 for reuse.

It is to be understood that the invention can be embodied in various forms and is not to be limited to the examples specifically discussed above. The range of components and configurations which can be utilized in the practice of the present invention is virtually unlimited.

Having thus described the invention, what is claimed as new and desired to be secured by Letters Patent is:

1. A regenerative vapor energy recovery system for an ethanol plant, which includes:
    a regenerative precondenser configured for receiving regenerative vapors from the ethanol plant;
    a hot water surge tank receiving a heated water stream from said regenerative precondenser;
    a hot water flash tank receiving a hot water supply from said surge tank via a heated water pump;
    wherein said hot water flash tank is in fluid communication with said ethanol plant to provide hot water flash vapor to said ethanol plant;
    wherein said hot water flash tank is in fluid communication with said ethanol plant to receive rectifier bottoms from said ethanol plant;
    wherein said hot water flash tank is in fluid communication with said ethanol plant to receive dilution water from said ethanol plant; and
    the energy recovery system further comprising a hot water recirculation pump configured to receive warm water cooled in said hot water flash tank and pump a warm water stream to said regenerative precondenser.

2. The system according to claim 1, wherein the system is configured to divert excess water from the warm water stream to the ethanol plant for use in dilution.

3. The system according to claim 1:
    wherein the system is configured to supply a partially-condensed regenerative vapor stream from said regenerative precondenser to said ethanol plant.

4. The system according to claim 1 wherein said hot water flash tank receives rectifier bottoms from said ethanol plant to maintain an adequate water level in the hot water flash tank.

5. The system according to claim 1 wherein said heated water stream is produced at a variable-rate to the hot water surge tank.

6. The system according to claim 5 wherein said heated water stream is maintained between 190° F. and 200° F.

7. The system according to claim 1 wherein the hot water supply is pumped via the heated water pump to the hot water flash tank where the hot water supply is cooled to 185° F. and creates the hot water flash vapor for diversion to the ethanol plant for use as an energy source.

8. The system according to claim 1 wherein the hot water recirculation pump is configured for sending a recirculated water stream back to the ethanol plant for reuse.

9. The system according to claim 8 wherein said hot water recirculation pump is in fluid communication with said ethanol plant to send excess water from the regenerative vapor energy recovery system back to the ethanol plant for use as dilution water.

10. The system according to claim 8 wherein the hot water flash tank is configured to be in fluid communication with the ethanol plant to supply a water stream to the ethanol plant in the form of 190° F. to 200° F. heated water.

11. The system according to claim 10 wherein the flash tank hot water is fed back to the hot water flash tank for releasing energy in the form of hot water flash vapor.

12. A regenerative vapor energy recovery system for an ethanol plant, which includes:
    a regenerative precondenser configured for receiving regenerative vapors from the ethanol plant;
    a hot water surge tank receiving a heated water stream from said regenerative precondenser;
    a hot water flash tank receiving a hot water supply from said surge tank via a heated water pump;
    wherein said hot water flash tank is configured to be in fluid communication with said ethanol plant and is configured to provide hot water flash vapor to said ethanol plant;
    said hot water flash tank is configured to receive rectifier bottoms from said ethanol plant;
    wherein said hot water flash tank is in fluid communication with said ethanol plant to receive dilution water from said ethanol plant;
    said energy recovery system comprising a hot water recirculation pump configured to pump a warm water stream to said regenerative precondenser;
    wherein the system is configured to divert excess water from the warm water stream to the ethanol plant for use in dilution;
    said hot water recirculation pump connected to and receiving hot water from said hot water flash tank;
    wherein the system is configured to supply a partially-condensed regenerative vapor stream from said regenerative precondenser to said ethanol plant;
    said hot water flash tank receiving rectifier bottoms from said ethanol plant to maintain an adequate water level in the heated water flash tank; and
    said heated water stream is produced at a variable-rate to the hot water surge tank.

13. The system according to claim 12 wherein said heated water stream is maintained between 190° F. and 200° F.

14. The system according to claim 13 wherein the hot water supply is pumped via the heated water pump to the hot water flash tank where the hot water supply is cooled to 185° F. and creates the hot water flash vapor for diversion to the ethanol plant 54 for use as an energy source.

15. The system according to claim 12 wherein the hot water recirculation pump is configured for sending a recirculated water stream back to the ethanol plant for reuse.

16. The system according to claim 12 wherein said hot water recirculation pump is in fluid communication with said ethanol plant to send excess water from the regenerative vapor energy recovery system back to the ethanol plant for use as dilution water.

17. The system according to claim 12 wherein the hot water flash tank is in fluid communication with said ethanol plant to supply a water stream to the ethanol plant in the form of 190° F. to 200° F. heated water.

18. The system according to claim 17 wherein water from said ethanol plant is fed back to the hot water flash tank for releasing energy in the form of hot water flash vapor.

* * * * *